Patented Nov. 29, 1927.

1,650,975

UNITED STATES PATENT OFFICE.

CLAYTON W. BEDFORD, OF AKRON, OHIO, ASSIGNOR TO THE B. F. GOODRICH COMPANY, OF NEW YORK, N. Y., A CORPORATION OF NEW YORK.

ART OF VULCANIZING RUBBER.

No Drawing. Application filed June 28, 1924. Serial No. 722,961.

This invention relates to accelerators for the vulcanization of rubber by sulfur and more specifically to volatile, liquid or low melting primary organic amines.

Gaseous or volatile amines require special methods for incorporation into a rubber mix and are not readily controllable with regard to proportions added to the rubber so that uniformity of cure in the finished product is not easily attainable. For similar reasons, liquid or low melting amines are not amenable to exact control of the proportions added to a rubber mix. The liquids run off at the ends of the rubber mill, volatilize in part and are inconvenient to manipulate in the rubber factory as compared to solid accelerators. Volatilization of the accelerator or the handling of liquid amines usually constitutes a health hazard for the workmen.

The object of this invention is to provide solid derivatives of low melting, liquid or volatile amines which mill readily into a rubber mix, which are substantially less volatile than the original amines, which have a less poisonous effect on the workmen and which allow the incorporation of previously determined amounts of accelerator into a rubber mix, thereby insuring greater uniformity in the curing properties of the mix.

Metallic salts such as zinc sulfate or mercuric chloride are known to form solid addition compounds with primary organic amines. Zinc sulfate, containing about one molecule of water of hydration, reacts, for example, with aniline, p-toluidine, benzylamine, p-phenetidine, piperidine, ethylene diamine, p-amido dimethylaniline, iso-amylamine or the like to produce solid reaction products. I find that these addition products are valuble accelerators for the vulcanization of rubber, and are substantially free from the objectionable features of the original amines. Metallic salts such as zinc or aluminum chloride form addition products with primary amines but the products are strongly hygroscopic and therefore not as suitable for use in rubber mixes as the less hygroscopic products derived from such salts as zinc sulfate or mercuric chloride.

Example I.—One part by weight of $ZnSo_4.1H_2O$ is added to one part by weight of dry aniline or p-amido dimethylaniline and the mix is stirred at ordinary tempera-
tures. A small amount of water may then be added to hasten the reaction. The mix gradually heats up as the amine is absorbed by the salt, steam is evolved and the mass swells to several times its original volume producing a fine dry powder which does not require grinding before incorporating into rubber. This example may be further varied by using as high as four mols of the amine for each mol of zinc sulfate.

Example II.—One part by weight of mercuric chloride is stirred into two parts by weight of dry aniline or other primary amine free from water. The mixture is slowly stirred until the reaction is complete. The resultant product is non-volatile and an active accelerator.

Example III.—One part by weight of air dry zinc sulfate crystals are added to one part by weight of piperidine, n-butylamine, iso-amylamine or ethylene diamine mono-hydrate. The mixture is stirred until it becomes pasty and the sulfate crystals are nearly dissolved. The mass is then allowed to stand for several hours for completion of the reaction. In the case of ethylene diamine mono-hydrate, the reaction is slower and may require 24 hours or longer for completion.

The following table shows the accelerating action of the solid reaction products of liquid amines with zinc sulfate and mercuric chloride. In each case the equivalent of one part of the amine, in the form of its reaction product with the inorganic salt, was added to a mix consisting of Pale crepe— 100, zinc oxide—10 and sulfur—4 (parts by weight). All cures were at 287° F.

| Amine. | Salt. | Cure (minutes). | Tensile lbs. 1 sq. in. |
|---|---|---|---|
| $(CH_2NH_2)_2.H_2O$ | $ZnSO_4.H_2O$ | 60 | 3,775 |
| $(CH_3)_2CH-CH_2-CH_2-NH_2$ | $ZnSO_4.H_2O$ | 75 | 3,350 |
| $CH_3(CH_2)_3NH_2$ | $ZnSO_4.H_2O$ | 75 | 3,900 |
| $C_6H_5-CH_2-NH_2$ | $ZnSO_4.H_2O$ | 120 | 2,800 |
| $C_5H_{10}NH$ | $ZnSO_4.H_2O$ | 105 | 3,900 |

| Amine—Continued. | Salt. | Cure (minutes). | Tensile lbs. 1 sq. in. |
|---|---|---|---|
| $(CH_3)_2N.C_6H_4.NH_2$ (p) | $ZnSO_4.H_2O$ | 120 | 3,600 |
| $C_2H_5-O-C_6H_4-NH_2$ (p) | $ZnSO_4.H_2O$ | 150 | 2,900 |
| $CH_3.C_6H_4-NH_2$ (p) | $ZnSO_4.H_2O$ | 180 | 2,400 |
| $C_6H_5NH_2$ | $HgCl_2$ | 150 | 2,525 |

I do not wholly limit myself to the specific proportions of amine and metallic salt as set forth in the above examples, since one molecular weight of a salt will react with two or more molecular weights of amine and the proportions by weight, accordingly, may vary with the molecular weights of the materials.

I claim:

1. A process for the vulcanization of rubber by sulfur or similar vulcanizing agent which comprises the preparation of an addition product of a metallic salt and a primary organic amine, incorporating the addition product into a vulcanizable rubber mix, and effecting vulcanization.

2. A process for the vulcanization of rubber by sulfur or similar vulcanizing agent which comprises the preparation of an addition product of an inorganic metallic salt and a primary organic amine, incorporating the addition product into a vulcanizable rubber mix, and effecting vulcanization.

3. A process for the vulcanization of rubber by sulfur or similar vulcanizing agent which comprises the preparation of an addition product of a zinc salt and a primary organic amine, incorporating the addition product into a vulcanizable rubber mix, and effecting vulcanization.

4. A process for the vulcanization of rubber by sulfur or similar vulcanizing agent which comprises the preparation of an addition product of zinc sulfate and a primary organic amine, incorporating the addition product into a vulcanizable rubber mix, and effecting vulcanization.

5. A process for the vulcanization of rubber by sulfur or similar vulcanizing agent which comprises the preparation of an addition product of a metallic salt and a primary aromatic amine, incorporating the addition product into a vulcanizable rubber mix, and effecting vulcanization.

6. A process for the vulcanization of rubber by sulfur or similar vulcanizing agent which comprises the preparation of an addition product of an inorganic metallic salt and a primary aromatic amine incorporating the addition product into a vulcanizable rubber mix, and effecting vulcanization.

7. A process for the vulcanization of rubber by sulfur or similar vulcanizing agent which comprises the preparation of an addition product of a zinc salt and a primary aromatic amine, incorporating the addition product into a vulcanizable rubber mix, and effecting vulcanization.

8. A process for the vulcanization of rubber by sulfur or similar vulcanizing agent which comprises the preparation of an addition product of zinc sulfate and a primary aromatic amine, incorporating the addition product into a vulcanizable rubber mix, and effecting vulcanization.

9. A process for the vulcanization of rubber by sulfur or similar vulcanizing agent which comprises the preparation of an addition product of a metallic salt and para amido dimethylaniline, incorporating the addition product into a vulcanizable rubber mix, and effecting vulcanization.

10. A process for the vulcanization of rubber by sulfur or similar vulcanizing agent which comprises the preparation of an addition product of an inorganic metallic salt and para amido dimethylaniline, incorporating the addition product into a vulcanizable rubber mix, and effecting vulcanization.

11. A process for the vulcanization of rubber by sulfur or similar vulcanizing agent which comprises the preparation of an addition product of a zinc salt and para amido dimethylaniline, incorporating the addition product into a vulcanizable rubber mix, and effecting vulcanization.

12. A process for the vulcanization of rubber by sulfur or similar vulcanizing agent which comprises the preparation of an addition product of zinc sulfate and para amido dimethylaniline, incorporating the addition product into a vulcanizable rubber mix, and effecting vulcanization.

13. A vulcanized rubber derived from rubber or similar material combined with a vulcanizing agent and an addition product of a metallic salt with a primary organic amine.

14. A vulcanized rubber derived from rubber or similar material combined with a vulcanizing agent and an addition product of an inorganic metallic salt with a primary organic amine.

15. A vulcanized rubber derived from rubber or similar material combined with a vulcanizing agent and an addition product of a zinc salt with a primary organic amine.

16. A vulcanized rubber derived from rubber or similar material combined with a vulcanizing agent and an addition product of an inorganic metallic salt with a primary aromatic amine.

17. A vulcanized rubber derived from rubber or similar material combined with a vulcanizing agent and an addition product of an inorganic metallic salt with para amido dimethylaniline.

18. A vulcanized rubber derived from rubber or similar material combined with a vulcanizing agent and an addition product of zinc sulphate with para amido dimethylaniline.

19. An accelerator for the vulcanization of rubber comprising an addition product of an inorganic metallic salt and a primary organic amine.

20. An accelerator for the vulcanization of rubber comprising an addition product of an inorganic metallic salt with a primary aromatic amine.

21. An accelerator for the vulcanization of rubber comprising an addition product of an inorganic metallic salt with para amido dimethylaniline.

22. An accelerator for the vulcanization of rubber comprising an addition product of zinc sulphate and para amido dimethylaniline.

In witness whereof I have hereunto set my hand this 14th day of June, 1924.

CLAYTON W. BEDFORD.